US011865758B2

(12) United States Patent
Nishimura et al.

(10) Patent No.: US 11,865,758 B2
(45) Date of Patent: Jan. 9, 2024

(54) FLUORORESIN MOLDED ARTICLE

(71) Applicant: CHEMOURS-MITSUI FLUOROPRODUCTS CO., LTD., Tokyo (JP)

(72) Inventors: Hitomi Nishimura, Shizuoka (JP); Takahiro Nishimura, Shizuoka (JP); Bangjia Lin, Shizuoka (JP)

(73) Assignee: CHEMOURS-MITSUI FLUOROPRODUCTS CO. LTD., Tokyo (JP)

(*) Notice: Subject to any disclaimer, the term of this patent is extended or adjusted under 35 U.S.C. 154(b) by 855 days.

(21) Appl. No.: 16/626,718

(22) PCT Filed: Jun. 26, 2017

(86) PCT No.: PCT/JP2017/023368
§ 371 (c)(1),
(2) Date: Dec. 26, 2019

(87) PCT Pub. No.: WO2019/003265
PCT Pub. Date: Jan. 3, 2019

(65) Prior Publication Data
US 2020/0114563 A1  Apr. 16, 2020

(51) Int. Cl.
*B29C 48/00* (2019.01)
*B29C 48/06* (2019.01)
(Continued)

(52) U.S. Cl.
CPC .......... *B29C 48/022* (2019.02); *B29C 48/06* (2019.02); *B29C 48/07* (2019.02); *B29C 48/09* (2019.02);
(Continued)

(58) Field of Classification Search
None
See application file for complete search history.

(56) References Cited

U.S. PATENT DOCUMENTS 3,635,926 A   1/1972   Gresham et al.
5,461,129 A   10/1995  Kurihara et al.
(Continued)

FOREIGN PATENT DOCUMENTS

EP   0789039 A1   8/1997
JP   H07126329 A  5/1995
(Continued)

OTHER PUBLICATIONS

International Search Report (PCT/ISA/210) dated Sep. 26, 2017, by the Japanese Patent Office as the International Searching Authority for International Application No. PCT/JP2017/023368.

*Primary Examiner* — Robert J Grun

(57) ABSTRACT

A PFA molded article of a copolymer (PFA) of tetrafluoroethylene (TFE) and perfluoro(alkylvinyl ether) (PAVE), the content of the PAVE therein being from 1 to 10% by mol, characterized in that the PFA molded article has a flex life value of not less than 2,000,000 times, a zero shear viscosity of from 10,000 to 20,000 Pa·s, and a heating weight loss of not more than 0.05% by weight, and a process for the production thereof. The PFA molded article has a high flex life value, a low heating weight loss and a low zero share viscosity yet maintaining excellent mechanical properties such as tensile strength, etc., and can be produced in good yields.

7 Claims, 2 Drawing Sheets

(51) Int. Cl.
*B29C 48/07* (2019.01)
*B29C 48/09* (2019.01)
B29K 27/18 (2006.01)
B29K 105/00 (2006.01)

(52) U.S. Cl.
CPC .. *B29K 2027/18* (2013.01); *B29K 2105/0079* (2013.01); *B29K 2105/0085* (2013.01); *B29K 2105/0088* (2013.01); *B29K 2105/0094* (2013.01)

(56) References Cited

U.S. PATENT DOCUMENTS

| | | | |
|---|---|---|---|
| 5,688,885 | A | 11/1997 | Blair |
| 6,649,699 | B2 | 11/2003 | Namura |
| 6,774,196 | B1 * | 8/2004 | Taira .................. C08F 214/262 525/200 |
| 2005/0020792 | A1 | 1/2005 | Aoyama et al. |
| 2007/0106026 | A1 | 5/2007 | Namura |
| 2015/0191561 | A1 | 7/2015 | Kitagawa et al. |

FOREIGN PATENT DOCUMENTS

| | | | |
|---|---|---|---|
| JP | 2002167488 | A | 6/2002 |
| JP | 2003327770 | A | 11/2003 |
| JP | 2004161921 | A | 6/2004 |
| JP | 2006066329 | A | 3/2006 |
| JP | 2007131671 | A | 5/2007 |
| JP | 2007238960 | A | 9/2007 |
| JP | 2014005337 | A | 1/2014 |
| JP | 2017119750 | A | 7/2017 |

\* cited by examiner under the heading of page 1:

FLUORORESIN MOLDED ARTICLE

TECHNICAL FIELD

The present invention provides, in good yields, tetrafluoroethylene/perfluoro(alkylvinyl ether) copolymer molded article that has high flex life value (bending resistance), low heating weight loss and low zero shear viscosity yet maintaining excellent mechanical properties such as tensile strength, etc. and is also concerned to a process for the production thereof.

BACKGROUND ART

Fluororesins have been widely used owing to their excellent chemical properties, electrical properties, mechanical properties and surface properties. Among the fluororesins, a copolymer (PFA) of tetrafluoroethylene (TFE) and perfluoro(alkylvinyl ether) (PAVE) exhibits the above-mentioned properties of the fluororesin, excels in heat resistance, chemical resistance, pureness (chemical inertness without containing any additive) and stress crack resistance, and also has such a feature that it can be heat-melt formed owing to its melt fluidity (see patent documents 1 to 3). Therefore, the above copolymer has been used for the production of semiconductors and liquid crystals, and has also been used as a material for molding piping for transferring various kinds of chemical solutions in the chemical plants and the like plants, for molding joints for piping, for molding storage containers, pump and filter housings, tubes, and fittings. Specifically, the PFA pipes are commonly used for transferring (supplying) chemical solutions.

Production of the resin products is always accompanied by a problem which is to lower the cost of production. Therefore, in executing, for example, the extrusion molding, when it is attempted to increase the linear velocity at the time of extruding the tube by elevating the molding temperature in order to improve the productivity of molding, then there arouses a problem in that the resin decomposes in increased amounts due to the heat and causes an increased contamination due probably to the decomposed products. Therefore, it has been desired to decrease the formation of such substances. Specifically, the PFA was not suited for the use where high purity was required, such as in the production of semiconductors.

Further, as means for lowering the melt viscosity of a resin in order to increase the molding rate (linear velocity) during the extrusion molding, there has been known a method of lowering the molecular weight of the resin. If the molecular weight of the PFA is lowered, however, it was learned that there occurs a problem of a decrease in the repetitive bending resistance as represented by mechanical properties of the molded article such as flex life (often called MIT flex life, hereinafter FL) though the linear velocity could be increased. Specifically, in the use for molding the tubes, the flex life of the PFA decreases so seriously that the PFA cannot often be really used.

Concerning the MIT flex life of the PFA, a patent document 4 describes about increasing the FL value by increasing the melt viscosity or by increasing the content of the comonomer. When the melt viscosity is increased, however, the linear velocity decreases at the time of molding as described above and hence the productivity decreases. As for the comonomer content in the PFA, however, the melting point decreases with an increase in the comonomer content resulting in a decrease in the mechanical properties such as tensile strength. Therefore, it is not allowed to easily increase the content of the comonomer.

The present inventors have conducted keen study aiming at developing a PFA molded article that is capable of solving the problems inherent in the above-mentioned prior arts, and have arrived at the present invention.

PRIOR ART DOCUMENTS

Patent Documents

Patent document 1: Japanese Patent Laid-Open No. 2007-131671
Patent document 2: Japanese Patent Laid-Open No. 2003-327770
Patent document 3: Japanese Patent Laid-Open No. 2002-167488
Patent document 4: U.S. Pat. No. 3,635,926

OUTLINE OF THE INVENTION

Problems that the Invention is to Solve

The present invention provides, in good yields, tetrafluoroethylene/perfluoro (alkylvinyl ether) copolymer molded articles that have high flex life value (bending resistance), low heating weight loss and low zero shear viscosity yet maintaining excellent mechanical properties such as tensile strength, etc. and is also concerned to a process for the production thereof.

Here, the flex life value is a physical value that is important in the use where bending stress is received repetitively, and serves as a rough indication of the stress crack resistance.

Means for Solving the Problems

According to the present invention, there is provided a molded article comprising tetrafluoroethylene(TFE) and perfluoro(alkyl vinyl ether) (PAVE) copolymer (PFA) containing 1 to 10 mol % of perfluoro(alkylvinyl ether) (PAVE), wherein said molded article has a flex life value of not less than 2,000,000 times, a zero shear viscosity of from 10,000 to 20,000 Pas, and a heating weight loss of not more than 0.05% by weight.

In a preferred embodiment of the invention, the above-mentioned PFA molded article has a melt flow rate (MFR) of from 1 to 100 g/10 min. when measured with a load of 5 kg and a measurement temperature of 372±0.1° C. in accordance with ASTM D1238.

In a preferred embodiment of the invention, the above-mentioned molded article comprises the above-mentioned PAVE which is a perfluoro(ethylvinyl ether) or a perfluoro(propylvinyl ether).

In a preferred embodiment of the invention, the above-mentioned PFA molded article is a molded article selected from tube, bottle, fitting, valve, rod-like molded article and sheet-like molded article.

In a preferred embodiment of the invention, the above-mentioned PFA molded article is used as apparatus for the manufacture of apparatus semiconductors or liquid crystals or in a chemical plant.

In a preferred embodiment of the invention, the above-mentioned PFA molded article is an apparatus selected from tube (pipe), container (bottle), fitting (joint for piping), valve, carrier apparatus (wafer carrier), pump and filter housings.

According to the invention, further, there is provided a process for the manufacturing of the PFA molded article comprising tetrafluoroethylene(TFE) and perfluoro(alkyl vinyl ether) (PAVE) copolymer (PFA) containing 1 to 10 mol % of perfluoro(alkylvinyl ether, and having a melt flow rate (MFR) of 1 to 100 g/10 min. when measured with a load of 5 kg and a measurement temperature of 372±0.1° C. in accordance with ASTM D1238, wherein said manufacturing is performed at a temperature from 320 to 360° C., and molded article having a flex life value of not less than 2,000,000 times, a zero shear viscosity of from 10,000 to 20,000 Pa s, and a heating weight loss of not more than 0.05% by weight.

In the process for the production of the above-mentioned PFA molded article according to a preferred embodiment of the invention, the above-mentioned molding is an extrusion molding.

Effects of the Invention

According to the present invention, there is provided, in good yields, a PFA molded article having excellent mechanical properties and containing decomposed products in small amounts.

According to the present invention, there is provided, in good yields, the PFA molded article having a high flex life value which is concerned to mechanical properties, having a low heating weight loss which is concerned to the amount of the decomposed products, and having a low zero shear viscosity.

According to the invention, there is provided the PFA molded article having a low hydrochloric acid permeation coefficient and, hence, permitting blisters to occur little and, accordingly, maintaining surface smoothness for extended periods of time.

MODES FOR CARRYING OUT THE INVENTION

Figure 1:
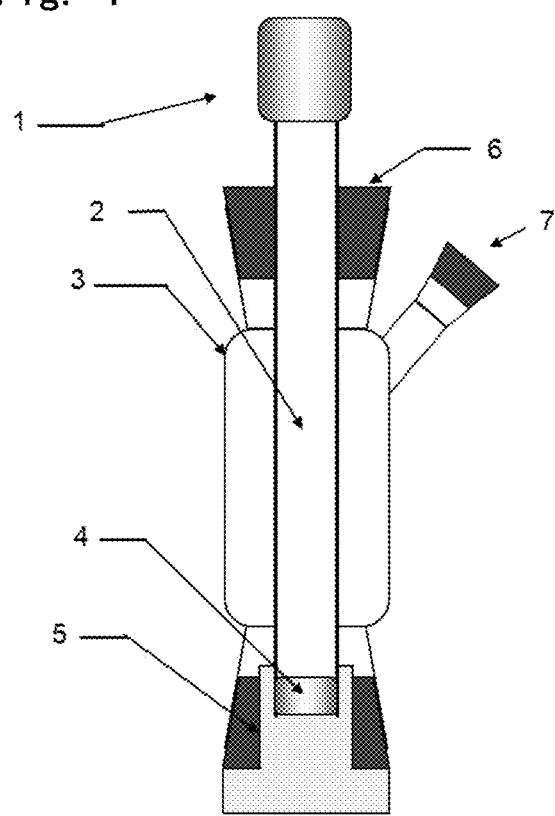
FIG. 1 It is a schematic view of an apparatus for measuring the hydrochloric acid permeability.

The present invention provides a molded article of a copolymer (PFA) of tetrafluoroethylene (TFE) and perfluoro (alkylvinyl ether) (PAVE), the content of the PAVE therein being from 1 to 10% by mol, wherein the PFA molded article has a flex life value of not less than 2,000,000 times, a zero shear viscosity of from 10,000 to 20,000 Pa s, and a heating weight loss of not more than 0.05% by weight.

The PFA is a copolymer obtained by the copolymerization of the tetrafluoroethylene (TFE) which is a main component and the perfluoro(alkylvinyl ether) (PAVE) which is a comonomer, and can be melt-formed.

The perfluoro(alkylvinyl ether) (PAVE) used as the comonomer can be represented by the following formula (1) or (2).

[Chemical 1]

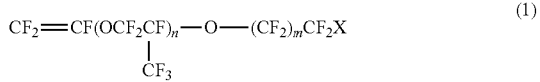

(wherein, X is H or F, n is an integer of 0 to 4, and m is an integer of 0 to 7.)

[Chemical 2]

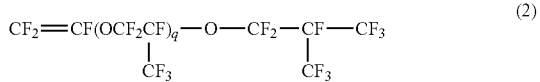

(wherein, q is an integer of 0 to 3.)

The PFA can be obtained by the solution polymerization, emulsion polymerization or suspension polymerization. For instance, the PFA can be obtained by a polymerization method (aqueous dispersion polymerization=emulsion polymerization) described in Japanese Patent No. 3980649. After the polymerization has been finished, the obtained aqueous dispersion, as required, is adjusted for its solid content or emulsion stabilizing agent, and is used.

Moreover, the obtained aqueous dispersion can be treated by a known traditional technology (e.g., U.S. Pat. No. 5,266,639) to recover the PFA in a solid form from the aqueous polymerization medium. For example, an electrolytic substance is added to the aqueous dispersion to aggregate fine colloidal particles of the fluororesin with mechanical stirring. Thereafter, the fine colloidal particles are separated from the aqueous medium and, as required, are washed with water and dried to obtain the PFA in the solid form. The solid PFA is formed and is used desirably being pelletized.

In the use for producing semiconductors, it is desired to use the PFA that has been fluorinated in advance to decrease contaminants (impurities) derived from the fluororesin. The PFA can be fluorinated by a widely known method. There can be exemplified such fluorination methods as those described in Japanese Patent Publication No. H4-83, Japanese Patent Publication No. H7-30134 and Japanese Patent Laid-Open No. 4-20507.

Among the PFAs mentioned above, the PFA used in the invention is a copolymer of the TFE and the PAVE, and contains the perfluoro(alkylvinyl ether) (PAVE) in an amount of from 1 to 10% by mol, preferably, from 1 to 8% by mol, more preferably, from 2 to 8% by mol and, further preferably, from 2.5 to 6% by mol.

Further, the PFA used in the present invention is, preferably, a copolymer of the TFE and the PAVE having not more than 4 carbon atoms, i.e., perfluoro(methyl vinyl ether) (PMVE), perfluoro(ethyl vinyl ether) (PEVE), perfluoro (propyl vinyl ether) (PPVE) or perfluoro(butyl vinyl ether) (PBVE) and, more preferably, perfluoro(ethyl vinyl ether) (PEVE) or perfluoro(propyl vinyl ether)(PPVE). The PAVE having more than 5 carbon atoms tends to be less taken into the polymer and becomes less polymerizable, which is not desirable.

The PFA may, further, contain an additional comonomer which is copolymerizable with the TFE. In this case, it is desired that the content of the additional comonomer is smaller than the content of the above-mentioned PAVE. As the additional comonomer copolymerizable with the TFE, there can be exemplified fluorine-contained comonomers such as perfluoroalkene having 3 to 6 carbon atoms, PAVE having 1 to 5 carbon atoms and chlorotrifluoroethylene.

The PFA may contain a PFA that contains the PAVE of a different kind or in a different amount and/or a PTFE. As the PTFE, there can be exemplified modified PTFEs that contain a homopolymer of tetrafluoroethylene or a comonomer in a trace amount of not more than 1% by weight, such as hexafluoropropylene, perfluoro(alkylvinyl ether), fluoroalkylethylene or chlorotrifluoroethylene.

The PFA used in the invention is measured for its melt flow rate (MFR) in compliance with the ASTM D1238 with a load of 5 kg and at a temperature of 372±0.1° C. It is desired that the MFR is measured to be from 1 to 100 g/10 min., preferably, from 1 to 50 g/10 min., and more preferably, from 1 to 20 g/10 min.

The PFA molded article of the invention can be obtained through the melt molding. As the melt-molding method, there can be exemplified an injection-molding method, an extrusion-molding method, a hollow molding method, a transfer molding method and the like method. Not being limited thereto only, however, the PFA molded article of the invention can also be formed by a molding method that is known per se.

In order to increase the linear velocity and, therefore, the productivity, the PFA has heretofore been formed at 380° C. which is higher than the melting point of the PFA or at a higher temperature (see the patent document 1). At such high temperatures, however, the PFA undergoes the decomposition and causes the molding machine to be corroded. Besides, the decomposed products that remain in the molded article often develop inconvenience, i.e., occurrence of contamination in the apparatuses that use the PFA.

The present invention executes the molding at a relatively low temperature and little permits the occurrence of inconvenience due to the thermal decomposition of the PFA, that could occur under the conventional molding conditions.

According to the present invention, the PFA is formed at a temperature of 310° C. to 370° C. and, preferably, 320 to 360° C. As a result, the invention makes it possible to obtain the PFA molded article having a low heating weight loss. In the invention, the molding temperature stands for the resin temperature.

By using the PFA that can be formed at a relatively low temperature as described above, the invention forms the article under the condition of 310° C. to 370° C. The molded article has a heating weight loss of not more than 0.05% by weight as measured by a method that will be described later. The heating weight loss that is small means that the PFA is thermally decomposed little during the molding and, as a result, the decomposed products remain little in the molded article. Accordingly, the PFA molded article of the invention causes little contamination in the apparatuses that use the PFA molded article.

The PFA molded article of the invention has a flex life value (FL value) of not less than 2,000,000 times and, preferably, not less than 3,000,000 times as measured by a method that will be described later. The molded article having such a large FL value means that it has a large bending resistance and is suited for the use where it receives bending stress repetitively.

The PFA molded article of the invention has a zero shear viscosity of from 10,000 to 20,000 Pas as measured by a method that will be described later.

The fact that zero shear viscosity lies in this range means that the extrusion linear velocity can be increased at the time of producing the molded articles, i.e., means that the molded articles can be produced in good yields.

The PFA molded article of the invention has excellent bending resistance and contains little decomposed products as described above and, therefore, can be produced in good yields.

Preferred examples of the PFA molded article of the invention are the molded articles that have a hollow portion.

The molded articles having a hollow portion are those molded articles having a hollow portion therein. Concretely, there can be exemplified tubular molded articles as well as molded articles having a desired hollow portion therein, such as piping for transferring (supplying) various kinds of chemical solutions used in the steps of producing semiconductors and liquid crystals, joint (fitting) for piping, storage containers, and housings for pumps and filters. The molded articles having the hollow portion can be favorably used for the apparatuses for supplying a variety kinds of acidic or alkaline chemical solutions used in the steps of producing semiconductors and liquid crystals, for the apparatuses for various chemical reactions, and for the apparatuses for producing semiconductors.

When the PFA molded article of the invention is in the form of a tube obtained through the melt-extrusion molding, the tube features excellent smoothness on the surface thereof in addition to the above-mentioned properties. The tube that is highly smooth on the inner surface thereof permits contaminants to adhere little on the surfaces thereof and, further, enables the adhered matter to be easily washed away.

When the PFA molded article of the invention is in the form of a tube obtained through the extrusion molding, the chemical solution flowing through the tube is permitted to permeate through the tube very little. The chemical solution permeability can be measured by a hydrochloric acid permeability test that will be described later. The tube of the invention has excellent resistance against the permeation of hydrochloric acid.

When the PFA molded article of the invention is in the form of a tube obtained through the melt-extrusion molding, the tube permits blisters to occur very little. Therefore, the tube can be used for extended periods of time.

Blisters are the swollen structures that occur on the outer surface of the tube. The PFA tube is used in very severe chemical, thermal or physical environments, or in a composite environment thereof, such as in the steps of producing semiconductors and liquid crystals, or in the chemical plants. Therefore, it is presumed that the blisters occur upon receiving physical destruction caused by chemical attack, sharp changes in the temperature and pressure, infiltration-permeation of chemical solutions and gases, as well as interactive actions thereof. When the blisters occur, the tube develops abnormal appearance on the outer surface thereof and its mechanical strength decreases. Therefore, it may often become difficult to use the tube for extended periods of time.

Further, when the PFA molded article of the invention is in the form of a tube obtained through the melt-extrusion molding, the tube permits chemical solutions to permeate through little and permits blisters to occur very little. Therefore, the tube can be used for extended periods of time.

According to the present invention, there is obtained the PFA article formed from the specific PFA that is highly formable, the PFA molded article having a bending resistance and featuring a small heating weight loss. The invention, further, makes it possible to improve the extrusion rate (linear velocity) at the time of melt-molding and hence to improve the efficiency of production.

EXAMPLES

The invention will now be described in further detail by way of Examples and Comparative Examples to which only, however, the invention is in no way limited.

Described below are the methods of measuring properties and the starting materials employed by the invention.

A. Measuring the Properties (1) Melting Temperature (° C.)

Melting point of the PFA was measured by using a diamond DSC manufactured by Perkin Elmer Co. 10 Milligrams of the sample was weighed, put into a dedicated aluminum pan, crimped by using a dedicated crimper, accommodated in the main body of the DSC, and was then heated. The sample was heated at a rate of 10° C./minute from 200° C. up to 380° C. From a melting curve obtained in this case, a melting peak temperature was found as the melting point (° C.).

(2) Flex life value

Flex life value was measured in compliance with the JIS P 8115. By using a 5-unit MIT bending resistance testing machine (Model 307) manufactured by Yasuda Seiki Seisakusho. Co., a film of a thickness of 0.2 mm was prepared as a test piece, and the number of times of bending was counted until the film was broken.

The test piece was prepared by milling the fluororesin molded article that was to be measured. The milled product was melted at a temperature of 350° C., and was compression-formed into a film of a thickness of 0.2 mm which was then used as the test piece in a predetermined shape (15 mm in width).

(3) Measuring the Heating Weight Loss

There were provided three aluminum cups (manufactured by As ONE Corp.) that have been heated in an oven at 380° C. for one hour. The cups were measured for their weights to the fifth decimal place by using an electronic balance. Each weight was regarded to be the weight of aluminum.

The fluororesin molded article to be measured was cut into squares of about 3 mm. About 10 g each of the squares were put into the three aluminum cups which were then measured for their weights to the fifth decimal place by using the electronic balance. Each weight was regarded to be the total weight.

The aluminum cups containing the fluororesin molded article being cut into 3 mm squares were placed on a metal tray, and were fired in the oven at 360° C. for one hour. After the firing, the aluminum cups were taken out of the oven and were allowed to cool naturally for 90 minutes. Thereafter, by using the electronic balance, the aluminum cups were measured for their weights to the fifth decimal place and were recorded. Each weight was regarded to be the weight after heated. The weight after heated becomes the total of the weight of the fluororesin after heated and the weight of aluminum.

The heating weight loss (% by weight) was calculated according to the following formula.

Heating weight loss (% by weight)=(total weight–weight after heated)/(total weight–weight of aluminum)×100

(4) Zero Shear Viscosity

By using a capillary flow tester (Capillograph 1D manufactured by Toyo Seiki Co.), 30 g of the fluororesin molded article being cut into squares of about 3 mm was put into the cylinder (cylinder diameter of 9.55 mm) heated at 340° C. and was held therein for 5 minutes so as to be completely melted. The molten resin was extruded through the orifice ($\varphi$2 mm×20 mm L) in the bottom portion at shear rates (sec$^{-1}$) of 0.76, 1.140, 1.520, 2.280, 3.040, 4.560, 7.600, 11.40, 22.80, 30.40, 45.60, 76.00, 114.0, 152.0, 228.0, 304.0, 456.0, and 760.0 to measure the shear viscosities (Pa·s).

The data of the obtained shear rates and shear viscosities were input to the TA Orchestrator Version 7.2.0.4 (manufactured by TA Instruments Co.), and to which the curve fitting was executed by using the Carreau Model.

The zero shear viscosity is calculated by the curve fitting that is based on the following formula.

$$y=C1(1+(C2x)^{C3})^{(C4-1)/C3}$$

C1=zero shear viscosity,
x=shear rate (sec$^{-1}$)
y=shear viscosity (Pa·s)

(5) Measuring the Surface Roughness

A sample of a square of about 5 mm was cut off from the obtained tube that has not been stretched, and the surface roughness (Ra) on the inner surface of the tube was measured by using a scanning type laser microscope (Color confocal microscope, OPTELICS C130 manufactured by Laser Tech Co.).

(6) Testing the Permeation of the Hydrochloric Acid

A tube of $\varphi$2.7 mm and a thickness of 1.6 mm was used for the analysis. An end of a PFA tube 2 cut into a length of 200 mm was melt-sealed with a PFA round rod 4. To the other end thereof was attached a sealing plug 1 of the Pillar Super 300. To the tube, as shown in FIG. 1, there were attached a Viton (registered trademark)/PTFE composite jig 5, a glass container 3 and a Viton (registered trademark) plug 6. From 1, the hydrochloric acid of a mass concentration of 35% was introduced up to the upper end of the Viton (registered trademark) plug, and the tube was sealed with the plug. Further, 80 g of ultrapure water was introduced into the glass container 3 which was then sealed with a Viton (registered trademark) plug 7. A PTFE seal was wound round the connection portions to accomplish the hermetic sealing. The device was placed to stand still in an oven heated at 70° C. After heated for 2 weeks, the amount of the chloride ions in the ultrapure water was measured by using the Ion Chromatography IC20/LC25 manufactured by Dionex Co. and was converted into the chloride ion permeability per a unit area.

(7) Measuring the Blisters

The number of blisters occurred on the molded article was measured relying on the test for occurring blisters described below.

(a) Testing the Occurrence of Blisters

The hydrochloric acid of a concentration of 35% by mass was contained in the hollow portion of the molded article that possessed the hollow portion. The molded article containing the hydrochloric acid was dipped in pure water in a container which was placed in an oven maintained at 70° C.

After held in this state for 2 weeks, the molded article was taken out and from which the hydrochloric acid was drained. The interior of the hollow portion of the molded article was washed with pure water 5 times, and was then air-dried at room temperature for 12 hours to obtain the molded article for measuring blisters.

When the molded article is a piping (e.g., tube), its end can be sealed by using a sealing plug. Otherwise, the end of the molded article can be sealed by being heat-melt-treated.

Moreover, when the molded article is a storage container (bottle), a filter housing, a pump or the like that is used in a hermetically sealed manner, the molded article can be sealed by using a sealing plug like in the case of the tube or by using a lid attached to the molded article. In the case of the joint (fitting) for piping, too, there can be used a sealing plug placed in the market like in the case of the tube.

(b) Measuring the Number of Blisters that Occurred

1) Transferring the Surface of the Molded Article to be Measured

A PFA plate (Shore D hardness of D51, a thickness of 1.5 mm) was used as a substrate and on which a carbon transfer paper (SOL General Carbon paper #1300 pencil use) was placed with its transfer surface facing upward. Further, a white copier plain paper (thickness of 0.09 mm) was placed thereon.

The molded article for measuring the blisters was placed on the copier paper, and the surface to be measured of the molded article was pressed thereon from the upper side with a load of 1 kg so that the pattern was formed by pressing on the transfer paper. The number of blisters was counted from the transferred image of 40 mm long and 20 mm wide.

When the surface to be measured of the molded article is a flat surface, the transfer paper may be pressed with the load of 1 kg on the surface to be measured. When the surface to be measured is a curved surface, the transfer paper may be moved on the surface to be measured while being pressed with the load of 1 kg to obtain the image that is transferred from the whole surface to be measured.

Figure 2:
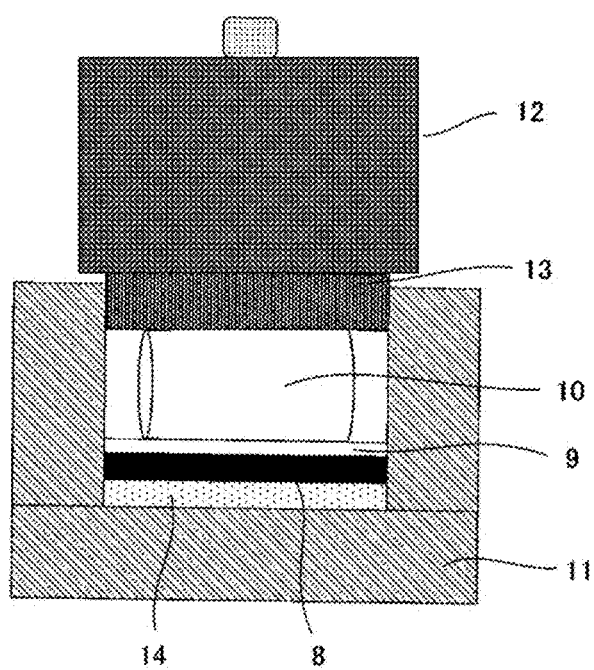
FIG. 2 It is a schematic view illustrating an example of molding a transferred image of when the molded article is in the shape of a tube.

FIG. 2 is a schematic view illustrating an example of molding a transferred image of when the molded article is in the shape of a tube. In FIG. 2, an image is transferred by turning a tube 10 cut into a width of 20 mm on a copier paper 9 on a carbon transfer paper 8 that is placed with its transfer surface facing upward on a PFA plate 14, the tube 10 being pressed by a weight 12 that has a load of 1 kg and being turned up to a length of 40 mm. In this case, a guide portion 11 may be provided as shown in FIG. 2 to transfer the image maintaining stability.

2) Counting the Number of Blisters

The number of spots having longer diameters of not less than 0.1 mm was counted from the transferred image over the range of 40 mm long and 20 mm wide. The number of spots was counted by using a microscope (Olympus BX51) having a magnifying power of 20 times.

The numbers of blisters were counted from the images transferred from the three molded articles, and an average value thereof was regarded to be the number of blisters.

3) Judging the Occurrence of Blisters

Relying on the number of blisters that were counted, the occurrence of blisters was judged on the following basis.

◯: Blisters occurred in a number of less than 5.

x: Blisters occurred in a number of not less than 5.

(8) Number of Unstable Terminal Groups

The number of unstable terminal groups was measured in accordance with Japanese Patent Publication No. H4-83.

B. Starting Materials (I) PFA (1)

Tetrafluoroethylene/perfluoroethylvinyl ether copolymer [perfluoroethylvinyl ether content: 4.7% by mol, melting point: 263° C., the number of unstable terminal groups (—$CH_2OH$ terminal groups, —$CONH_2$ terminal groups, —COF terminal groups) is less than 6 per $10^6$ carbon atoms].

(II) PFA (2)

Tetrafluoroethylene/perfluoropropylvinyl ether copolymer [perfluoropropylvinyl ether content: 1.8% by mol, melting point: 303° C., the number of unstable terminal groups (—$CH_2OH$ terminal groups, —$CONH_2$ terminal groups, —COF terminal groups) is less than 6 per $10^6$ carbon atoms]

(III) PFA (3)

Tetrafluoroethylene/perfluoropropylvinyl ether copolymer [perfluoropropylvinyl ether content: 1.4% by mol, melting point: 310° C., the number of unstable terminal groups (—$CH_2OH$ terminal groups, —$CONH_2$ terminal groups, —COF terminal groups) is less than 6 per $10^6$ carbon atoms]

Examples 1 to 3 and Comparative Examples 1 to 3

By using a φ30 mm extrusion molding machine, the PFAs (1) to (3) were formed at temperatures shown in Table 1 to obtain unstretched tubes having an outer diameter of 12.7±0.12 mm and a thickness of 1.59±0.10 mm. The obtained tubes were measured for their flex life values, heating weight losses and zero shear viscosities to obtain the results as shown in Table 1.

TABLE 1

|  | Example 1 | Example 2 | Example 3 | Comparative Example 1 | Comparative Example 2 | Comparative Example 3 |
|---|---|---|---|---|---|---|
| Kind of PFA | PFA (1) | PFA (1) | PFA (1) | PFA (1) | PFA (2) | PFA (3) |
| Forming temp. (° C.) | 320 | 340 | 360 | 380 | 360 | 360 |
| FL value | 3,390,000 | 4,450,000 | 4,680,000 | 2,710,000 | 1,430,000 | 1,100,000 |
| Heating weight loss | 0.0279 | 0.0249 | 0.0301 | 0.0551 | 0.0093 | 0.0176 |
| Zero shear viscosity | 1.72E+04 | 1.75E+04 | 1.72E+04 | 1.82E+04 | 3.00E+04 | 2.98E+04 |

Further, the tubes obtained in Example 3 and Comparative Examples 2 and 3 were measured for their surface roughness, and the tubes obtained in Example 3 and Comparative Example 3 were tested for their hydrochloric acid permeability. The results were as shown in Tables 2 and 3.

TABLE 2

|  | Example 3 | Comparative Example 2 | Comparative Example 3 |
|---|---|---|---|
| Kind of PFA | PFA (1) | PFA (2) | PFA (3) |
| Forming temperature (° C.) | 360 | 360 | 360 |
| Surface roughness (μm) | 0.009 | 0.029 | 0.021 |

TABLE 3

|  | Example 3 | Comparative Example 3 |
|---|---|---|
| Kind of PFA | PFA (1) | PFA (3) |
| Forming temperature (° C.) | 360 | 360 |
| Hydrochloric acid permeability μg · mm/cm$^2$ | 449 | 2727 |

Moreover, the tubes obtained in Examples 1 to 3 and Comparative Example 3 were tested for their occurrence of blisters, and the number of blisters that occurred was counted. By molding the transferred images, the number of blisters was counted to judge the occurrence blisters. The results were as shown in Table 4.

Figure 3:
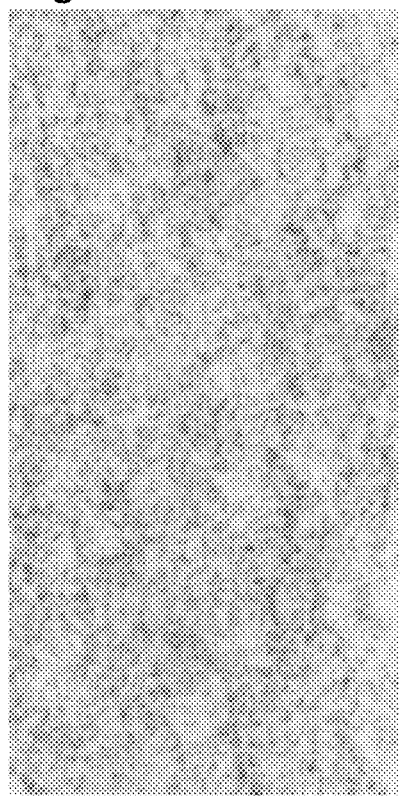
FIG. 3 It is a transferred image of Example 3 of the present application.
Figure 4:
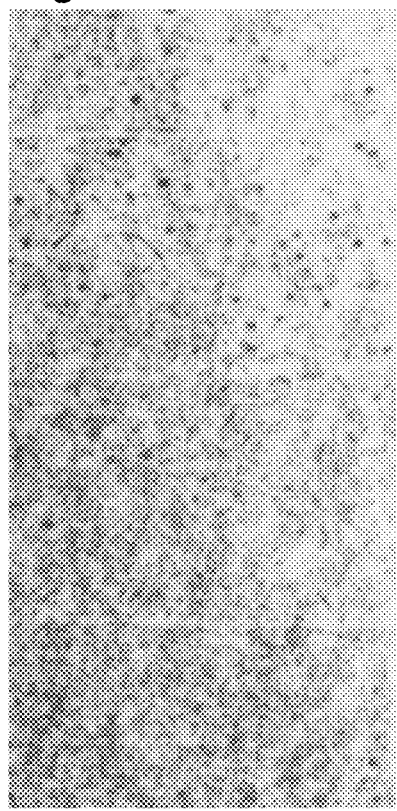
FIG. 4 It is a transferred image of Comparative Example 3 of the present application.

FIGS. 3 and 4 show the transferred images of Example 3 and Comparative Example 3.

TABLE 4

|  | Example 1 | Example 2 | Example 3 | Comparative Example 3 |
|---|---|---|---|---|
| Kind of PFA | PFA (1) | PFA (1) | PFA (1) | PFA (3) |
| Forming temperature (° C.) | 320 | 340 | 360 | 360 |
| Occurrence of blisters | ○ | ○ | ○ | x |

INDUSTRIAL APPLICABILITY

The present invention provides, in good yields, PFA molded articles that have high flex life values and low heating weight losses yet maintaining excellent mechanical properties such as tensile strength, etc. The PFA molded articles of the invention have a small hydrochloric acid permeation coefficient and, therefore, permit blisters to occur little and feature long-lasting surface smoothness.

DESCRIPTION OF THE REFERENCE NUMERALS AND SIGNS 1. sealing plug
2. PFA tube
3. glass container containing 35 mass % hydrochloric acid
4. PFA round rod
5. Viton (registered trademark)/PTFE composite jig
6. Viton (registered trademark) plug
7. Viton (registered trademark) plug
8. carbon transfer paper
9. copier paper
10. PFA tube for measuring blisters
11. guide portion
12. weight
13. PTFE plate
14. PFA plate

The invention claimed is:

1. A molded article having a hollow portion, the molded article consisting of a tetrafluoroethylene (TFE) and perfluoro(ethyl vinyl ether) (PEVE) copolymer (PFA) consisting of tetrafluoroethylene (TFE) and 1 to 10 mol % of perfluoro(ethyl vinyl ether) (PEVE), wherein said molded article has a flex life value of not less than 2,000,000 times, a zero shear viscosity of from 10,000 to 20,000 Pa·s, and a heating weight loss of not more than 0.05% by weight upon heating to 360° C. for one hour, wherein the PFA contains fewer than 6 unstable terminal groups per 106 carbon atoms, wherein the unstable terminal groups comprise —CH$_2$OH, —CONH$_2$, and —COF terminal groups.

2. The PFA molded article according to claim 1, wherein said PFA has a melt flow rate (MFR) of 1 to 100 g/10 min, when measured with a load of 5 kg and measurement temperature of 372±0.1° C. in accordance with ASTM D1238.

3. The PFA molded article according to claim 1, wherein said molded article is a molded article selected from tube, bottle, fitting, valve, and rod-like molded article.

4. The PFA molded article according to claim 1, wherein said molded article is used as an apparatus for the manufacture of semiconductors or liquid crystals or in a chemical plant.

5. The molded article according to claim 4, wherein said apparatus is selected from tube, container, fitting, valve, carrier apparatus, pump housing, and filter housings.

6. A process for the manufacturing of a PFA molded article having a hollow portion, the molded article consisting of a tetrafluoroethylene (TFE) and perfluoro(ethyl vinyl ether) (PEVE) copolymer (PFA) consisting of tetrafluoroethylene (TFE) and 1 to 10 mol % of and having a melt flow rate (MFR) of 1 to 100 g/10 min, when measured with a load of 5 kg and a measurement temperature of 372±0.1° C. in accordance with ASTM D1238, wherein said manufacturing is performed at a temperature from 320 to 360° C., and the PFA molded article having a flex life value of not less than 2,000,000 times, a zero shear viscosity of from 10,000 to 20,000 Pa·s, and a heating weight loss of not more than 0.05% by weight upon heating to 360° C. for one hour, wherein the PFA contains fewer than 6 unstable terminal groups per 106 carbon atoms, wherein the unstable terminal groups comprise —CH$_2$OH, —CONH$_2$, and —COF terminal groups.

7. The process for the manufacturing of the PFA molded article according to claim 6, wherein said manufacturing is an extrusion manufacturing method.

* * * * *